United States Patent [19]

Wurzer

[11] 4,251,053

[45] Feb. 17, 1981

[54] DIAPHRAGM DEVICE

[76] Inventor: Lothar Wurzer, Kasparstrasse 34, Efferen near Cologne, Fed. Rep. of Germany, 5032

[21] Appl. No.: 664,428

[22] Filed: Mar. 8, 1976

[30] Foreign Application Priority Data

Mar. 11, 1975 [DE] Fed. Rep. of Germany ....... 2510428
Feb. 14, 1976 [DE] Fed. Rep. of Germany ....... 2606033

[51] Int. Cl.³ .................................................. F16K 7/16
[52] U.S. Cl. ................................. 251/331; 137/855; 137/859; 92/99; 417/568
[58] Field of Search ................... 251/331, 298, 61; 137/855, 859; 92/89, 103 R, 98 R, 99

[56] References Cited

U.S. PATENT DOCUMENTS

| 2,134,072 | 10/1938 | Christensen | 92/98 D |
| 2,742,785 | 4/1956 | St. Clair | 92/103 R |
| 3,070,029 | 12/1962 | Russell | 417/568 X |
| 3,613,518 | 10/1971 | Prosser | 92/99 X |
| 3,709,461 | 1/1973 | Johnson | 251/61 X |
| 3,796,408 | 3/1974 | Sheppard | 251/61 X |

Primary Examiner—Arnold Rosenthal
Attorney, Agent, or Firm—Michael J. Striker

[57] ABSTRACT

In a diaphragm device, a round diaphragm of flexible material comprising a rim clamped between and sealingly gasketing upper and lower housing members, a coaxial annular arched vault within and circumferentially continuously joined at its outer periphery to the rim and having an inner downwardly directed periphery connected to an obliquely downwardly-facing disk-shaped portion including a molded-in or otherwise incorporated shape-maintaining oblique core disk to afford an integral swingable shiftable portion useful as a valving member in a shutoff type actuated valve or a check valve, or as the operably shiftable main part of a pump diaphragm, for which examples are disclosed.

16 Claims, 9 Drawing Figures

DIAPHRAGM DEVICE

The present invention relates to a diaphragm device, wherein an operatively movable part is provided or supported, for motion with respect to cooperative housing structure, by an elastic or at least flexible diaphragm component, which may also partition from each other in a fluid-tight manner two adjacent spaces under like or different pressures and usually defined in conjunction with two housing parts, which clamp the diaphragm member therebetween. Though diaphragm type devices wherein the invention is useful are quite varied, hereinafter examples are given in diaphragm valves and a diaphragm pump with principal discussion of a diaphragm shutoff valve; but these specific disclosures are not indicative of limitation on the invention.

Herein the term "diaphragm valve" comprehends a valve wherein a flexible diaphragm structure is clamped around a rim portion and at its central region shiftably supports a movable member as a valving member, whether the valve falls in the class of externally operated valves, such as globe valves and gate valves, or in the self-actuated class such as check valves. Whether or not the diaphragm structure serves to partition the fluid-filled space of the housing from another part, for example, from an operating spindle or other actuating means, as is usually the case in globe type or gate type valves, the region of the diaphragm structure, between the rim and the central part serving as or supporting a shiftable valving member, is subjected to particular stressing, and so also the corresponding region of the diaphragm structure in diaphragm pumps.

In globe type and similar valves where the valving or closure member is shifted more or less perpendicularly to the valve seat, rather large and thus undesirable pressure losses occur even under the fully open condition, in considerable part due to rather abrupt change in the flow path to pass through the seat. In contrast, in gate type valves, the movement of the valving member, for example a gate disk, wedge or cone, takes place in a direction substantially parallel to the cross section of the flow passage, in an arrangement which enables the valving member to be withdrawn entirely out of the flow space, and thus achieve a nearly completely smooth, free and straight flow space and a flow practically free of pressure loss.

For gate valves, as compared with globe valves, because of the considerably greater operating stroke involved and for limiting the multiply increased structural heights, the diaphragm, considered in section, has a more or less basically oval form, which undergoes guite considerable change of shape between the valve open and closed positions. A shortening of the stroke is obtained by a trade off to a narrowing of the flow section.

Diverse diaphragm forms (e.g., plate, ribbed, disk and hat shapes) have been used to keep the deformation through to and fro movement as small as possible, and thereby obtain the longest possible life. But the diaphragms which are flat in their basic form generally allow only a short stroke, for with large strokes the material is stretched and continually subjected to considerable stress. In contrast, rolling diaphragms permit a greater stroke, but limitations are imposed on the thickness or stiffness of the material which may be used, because of the great shape changes. With some diaphragm designs, upon actuation from the open to closed position, the diaphragm is reflected by about 180° adjoining its clamped mounting areas; with others, immediately to the mounting areas there is connected a sloping part with sections bearing off toward the same side of the diaphragm, in the region of which the direction changes in rolling always amounts to about 90°, in order to be able to keep the diaphragm diameter small consonant with the short length of the housing.

Also with other diaphragm forms, it is possible that in the transit from one to the other extreme end position, the shape changes, that is, as seen from the same side, a convex shape changes to concave. The convex-to-concave shape change is exemplified by the diaphragm valve disclosed in U.S. Pat. No. 3,310,282. This shows a symmetrically shaped diaphragm, which is opened and closed by a spindle-type actuating mechanism moved at right angles to the fluid flow direction in the valve body. Through this shape change, the diaphragm is heavily stressed in the region of its circumferential mounting rim, so that it is subject to an overstressing and short life through the continual to and fro bending. Like disadvantage attends the shutoff valve of French Patent No. 1,031,255 which has a distinctive, pronounced valving closure element.

Other known diaphragm forms, between the outer mounting rim and the middle region, take an arcuately shaped course which is maintained in all operative positions. This is enabled either by the diaphragm being constrained by the shape of the housing to hold to its basic form, being thereby subjected to compression; or by compromising and accepting a substantially smaller stroke then otherwise actually possible.

Belgian Patent No. 504,836 discloses a shutoff diaphragm valve in which a spindle type actuating device, disposed obliquely to the main flow direction in the valve body, perpendicularly engages the closure or valving element in the valve-closed position. A flat head end of the spindle is engaged in and under a forked lug secured parallel to, and above the upper face of, the valving member. In this arrangement, for the valve open position, the spindle end has local near linear contact on the forked lug, whereas in the closed position a flat end surface of the head abuts the valve member.

In this Belgian patent, the diaphragm structure itself is eccentric, with the valving element offset from the diaphragm center. With this diaphragm, at each opening and closing of the valve, a heavy flexing occurs in the region of smaller span between the valving element and the clamped diaphragm rim, likewise leading to rapid material fatigue. Furthermore, at each valve closing, the longer valving element-to-rim span region of the diaphragm is stretched, which likewise contributes to shortened life through overstressing and consequently developed brittleness. The further proposal of this Belgian patent, to give the longer span region an undulate form to provide greater length and thereby avoid stretching, likewise contributes to wearing out, because a continuous flutter occurs in the folds.

It is an object of the present invention to provide a diaphragm structure, for the described purposes, which assures a required motion without harmful to and fro movement, without compression, without untoward bending and without rolling motion, but yet enabling use of the full stroke even under high working pressure, and which upon transit, from one extreme setting to the other and reversely, undergoes no change in its basic shape.

For the achievement of this object, for example, in a device for partitioning from each other two adjacent spaces, at like or different pressures, there is provided a diaphragm structure of elastic or at least flexible material such as a rubber or synthetic plastic elastomer, optionally having a reinforcing web or mesh insert, which diaphragm is mounted between two housing components, and in its central region is constructed as an obliquely disposed shiftable member swingable in flap-like manner between two extreme operative positions, for example as a valving closure member; and further in the region between its clamped rim and the movable member, the diaphragm is provided with an annular vault or circumferential trough-like arching which, as seen from one side being say concave at one extreme operative position, maintains that concavity at and in transitions to and from the other extreme position.

Through this structure, for its two extreme positions and all intermediate positions, in the diaphragm all shape changes extend simultaneously and uniformly, i.e., without discontinuity, over the entire circumferential extent of the annular vault, and the diaphragm material is subjected to simple flexing. Moreover, a diaphragm constructed in accordance with the invention has manifold applications, not only in a valve housing to constitute a shutoff valve, but also for a check valve or as a diaphragm in a diaphragm pump.

For the embodiment in a shutoff valve having a housing or body with advantageously a substantially straight through-flow passage and a valve seat oblique to the flow direction, and having further a valving element similarly obliquely disposed and supported at the diaphragm central region for a flap-like swinging movement between the open and the closed positions, the diaphragm is mounted between an open side of the valve body and a bonnet or body cap, and is pivotally engaged by an operating spindle disposed preferably obliquely to the flow direction, and pivotally connected at or near the middle of the valving element. Furthermore in accordance with the invention between its mounting rim and the valving element, the diaphragm then has in its open and closed and intermediate positions a circumferential inverted trough-like annular vault, which is concave as seen from the valve seat. With setting adjustments of the valve, hence change of diaphragm position, only the radius of curvature of the arching changes, i.e., in the radial sections of the vault, avoiding those heavy bending deflections of harmful character in the region of the mounting rim, which occur in many known type globe or gate valves and pumps; and as well avoiding other harmful deformations, above all, that snapping of the diaphragm, in changing from a convex to a concave form, which leads to a rapid material fatigue. The changing of the curvature radius of the vault region or arching has no deleterious effect. Also there occurs none of the rolling motion of the typical roll diaphragm.

By a further valve aspect of the invention, for the as-fabricated shape of the diaphragm, the pivot point of the valve spindle engagement on the movable or valving element, and the curvature centers for the diaphragm vault all lie upon a common line in a diaphragm symmetry plane through the pivot point. In the assembled valve this line extends parallel to the longitudinal axis of the valve body, to which the flow axis approximates, and that line then advantageously further lies in the region of the diaphragm rim.

Through this expedient, a further improvement is attained, because the forces exerted by the valve fluid upon the diaphragm material during opening and closing actuation are small. Especially avoided is a condition where the fluid flow forces can act on the diaphragm through a lever arm; and accordingly, the bonding region on the valving member and the spindle pressure point remain unstressed.

By another aspect of the invention, for the as-fabricated condition, the aforesaid centers of curvature have an equal or nearly equal radial spacing from an operator or actuator connection point—in a valve, from the valve spindle connection point on the valving member; and also, throughout its entire circumferential extent, that annular vault has a like radius of curvature. As assembled in a valve housing for the open position and in its diametric cross section taken longitudinally of the valve, at opposite ends, the diaphragm annular vault has a maximum and a minimum radius of curvature with that radius constantly decreasing from one diaphragm end to the other in a downstream direction. Further at the open position, the seat-facing flat surface of the valving member extends nearly parallel to the longitudinal axis of the valve housing. A shorter stroke may be used, and the flow cross section is well maintained.

A diaphragm structure in accordance with the invention now enables fabrication of the diaphragm from materials which are less flexible then those of natural or synthetic rubbers, and which hitherto were not useable as materials of construction, though they would advantageously afford higher corrosion and/or temperature resistance. This is possible, because the diaphragm remains true to or preserves its basic form in operation and does not basically alter its fundamental as-molded form upon opening and closing of the valve; but rather merely its arch radius of curvature is changed.

Accordingly, stretching, compression, tearing, oscillation, rolling and like movement of the diaphragm are excluded, conducive to enhanced operational reliability. Therefore, a diaphragm of the invention and a device incorporating the same, such as a valve, can be used at high pressure and/or temperatures ranges.

Further the invention also permits making the vault part of the diaphragm so thick that a shutoff valve can be used at higher operating pressures or temperatures then have been hitherto possible; and in consequence of the basically maintained diaphragm shape, without danger of a rapid material fatigue.

The diaphragm may be fabricated, for example, through injection or compression molding; or other modern techniques, especially those appropriate to materials which can now be used for this form of diaphragm, for example VITON offered by E. I. DuPont de Nemours & Co. or other fluoroplastics, such as the PTFE, PCTFE and FEP fluorocarbons.

Through the lifting and simultaneous tilting achieved with the diaphragm of the invention and its actuation, quite shortly after the valving member leaves closed position, the valve seat is completely exposed to be flushed clean by the flowing medium. Furthermore, deposits in the region of the diaphragm are avoided, because in both the closed and open positions no closed annular space is present, but rather the annular space about the seat remains connected with the flow passage.

The canting lift or unseating motion has the further advantage that there is a more even change in flow velocity; and no sudden closing occurs, thereby avoiding pressure shocks. Also because of its shape in combination with the enabled lifting-tilting motion, the diaphragm has no tendency toward fluttering.

One-sided stressing of the diaphragm, which could lead to stretching, does not occur, (a) since the pivot or tilting point of the valving element lies always on the axis of the setting device or spindle, and the spindle is inclined in the body at an appropriate angle to be perpendicular to the plane of the valve closure member of the diaphragm at its middle setting where it has its as-fabricated disposition, (b) and since further only a small tilting movement of the valving member occurs in the motions of opening and closing, and the size of the curvature radius of the annular vault of the unstressed, i.e., as-fabricated diaphragm, is predetermined for the contemplated stroke length.

At the same time, the invention permits maintaining the flow cross section area, without requiring a trade-off to a longer stroke in the actuating mechanism.

Figure 1:
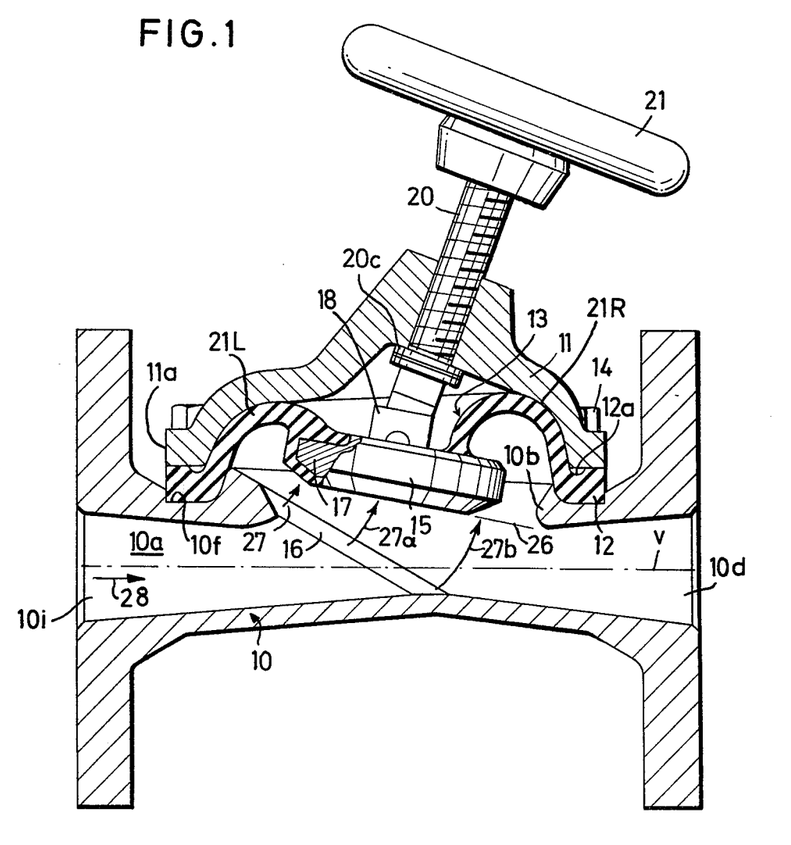
FIG. 1 is generally a vertical longitudinal section through a shutoff valve incorporating a diaphragm in accordance with the invention, the valve being shown in full open position and a diaphragm-supported valving member being shown in elevation.
Figure 2:
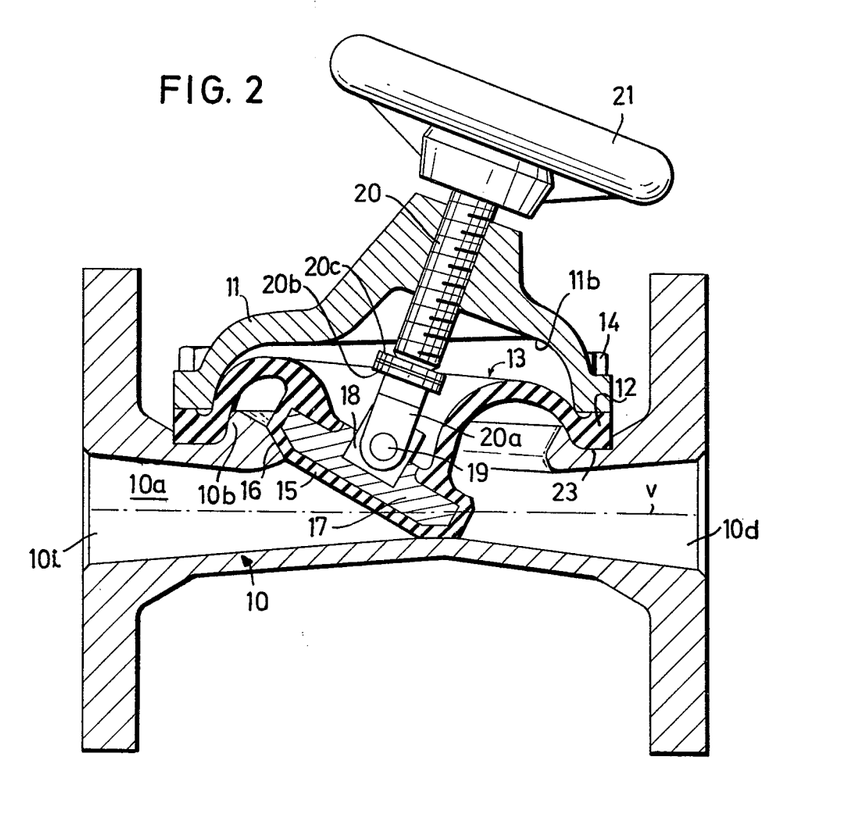
FIG. 2 is similar to FIG. 1, but shows the valve in the closed position and entirely in section.
Figure 3:
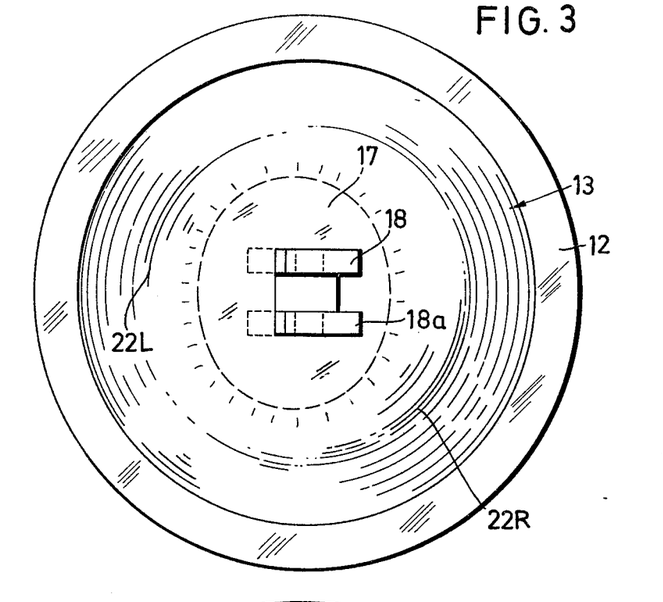
FIGS. 3 and 4 are respectively enlarged top and bottom plan views of the diaphragm structure.
Figure 4:
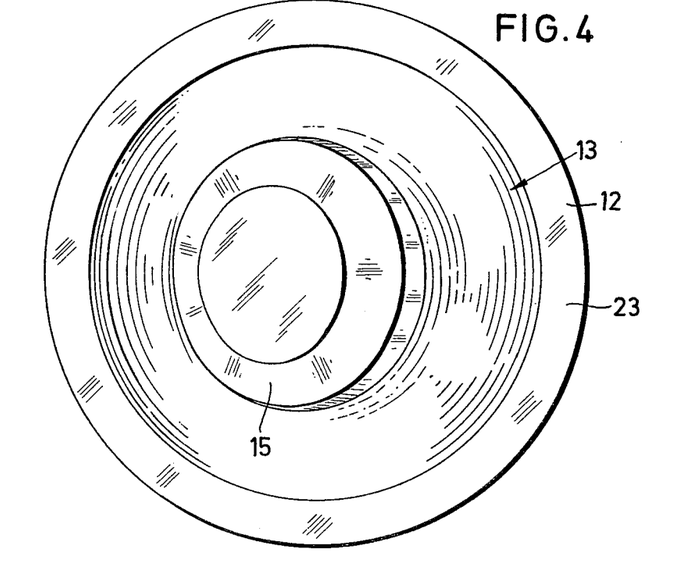

Other objects and advantages will appear from the following description and from the drawings of certain embodiments of the invention, wherein:

FIGS. 5, 6, 7 show the shape of the diaphragm at the vertical longitudinal section for different valve settings or positions; FIGS. 5 and 7 respectively corresponding to the extremes of FIGS. 1 and 2, and FIG. 6 corresponding to a middle position and being also a section of the diaphragm in its natural or free, i.e., as-fabricated, state;

VALVE EMBODIMENT—GENERAL STRUCTURE—FIGS. 1-2

The particular valve embodiment of the invention in the diaphragm shutoff valve of the drawing FIGS. 1-7 comprises, as principal components, the valve body 10 providing a through flow passage 10a, an oblique valve seat 16 around that passage, and a top aperture above the seat; the body-closing, upwardly recessed cap or bonnet 11; a flexible impervious diaphragm member 13, shiftably supporting an integral disk-like closure member or valving member 15 reinforced for rigidity and shape maintenance by an incorporated metal core disk 17; and valve operating means, including a spindle 20 extending through and axially shiftable in an upward boss-thickened region of the bonnet, for moving the valving member to and from the valve seat 16. Though the invention is applicable with an appropriately actuated sliding spindle, the spindle here is threaded in the bonnet for axial shift by actuating rotation of the hand wheel 21.

The valve and its components represent structure symmetrical about the plane of the sections of FIGS. 1, 2, 5, 6, and 7, that is, the vertical longitudinal center-plane, which includes the body axis "v" and the axis of spindle 20. Thus the body, the diaphragm and the bonnet are assembled with their respective planes of symmetry coplanar, in the symmetry plane for the entire valve.

The body provides a substantially straight through-flow passage or path with axis approximating to the longitudinal body axis "v" extending between the centers of the parallel, circumferentially flanged inlet and discharge outlet openings which are respectively 10d and 10d for the preferred flow direction 28 from left to right. The flow passage convergence or contraction from each end, inwardly to the oblique valve seat 16, as seen in FIGS. 1 and 2, is at a maximum in the vertical section, and in successive axial planes the inward contraction decreases and then becomes a divergency or expansion with maximum in the horizontal plane, to preserve flow area, and to avoid abrupt changes in the flow passage as it approaches and leaves the valve seat region.

Bonnet-securing and clamping bolts 14, through and circumferentially equi-spaced about the bonnet rim region, are threaded into the valve body; and thus through its flat-bottomed annular clamping formation or rim 11a, the bonnet sealingly clamps the flat thickened annular mounting rim portion 12 of the diaphragm in gasket-like manner against a corresponding diaphragm-mounting flat annular body surface 10f, as principal area for a rim seat. The diaphragm and bonnet rims may be apertured for this purpose, or the bolts may pass externally of the rim 12. The body top opening thus closed and sealed by 11 and 13 (see FIGS. 1 and 2) is bounded by an annular circumferentially continuous top-rounded bead or rib 10b into which the flat seat area 10f merges, as shown at the diaphragm sections or "loops" 22L, 22R.

A circumferentially continuous relief groove 12a, about semi-circular in cross section, is present at the transition region between the upper clamped surface of the rim 12 and the upwardly directed outer surface of the annular vault 22.

The axis of the annular diaphragm-accepting seat 10f is the line perpendicular to the plane of and through the geometric center for that seat, and it intersects the body axis "v" (see also FIG. 6) and therewith defines the body longitudinal center plane, the body plane of symmetry. In this embodiment, these axes are perpendicular to each other. The valve seat axis, the axis of the conical surface represented by the bevel of seat 16, lies in the plane of body symmetry; and thus an arbitrary plane perpendicular to that seat axis and intersecting the seat, termed the "plane" of that seat 16, is inclined to axis "v".

The active member or element 15 (see sections of FIGS. 5, 6 and 7 as well as FIGS. 3 and 4) in effect being suspended generally centrally and obliquely from the diaphragm as a valving member, in form is a cylindrical flat-bottomed body having continuity with the material constituting the other regions of the diaphragm, being here considered an elastomer molded about an interior metal reinforcement and/or shape-maintaining core disk 17; the latter thus being enveloped in, i.e., molded into, the elastomer constituting the diaphragm member as a whole. A textile-like web material may also be molded within other regions of the diaphragm where this is fabricated say by a molding type method. The valve closing or sealing surface on 15 is a circular beveled edge, complementary to the female bevel of seat 16. Pivot pin 19 as the point of action connects the inner end of the valve operating structure to the valving member between the two parallel oblong ears 18, 18a, defining a fork projecting upwardly from the core disk top.

In this embodiment, inclined spindle 20, carrying the operating hand wheel 21 fixed on its outer end, is threadedly engaged in a threaded inclined bore through the thickened central part of the bonnet. The plane, perpendicular to the plane of the flat bottom of bonnet rim 11a and including the axis of the spindle-receiving bonnet bore, is the plane of bonnet symmetry. The bore inclination is hereinafter implicitly dealt with in terms of the spindle axis inclination.

The operating structure includes the pivot-pin-secured end link element 20a as part of means coupling the rotatable valve spindle end to the ears 18–18a for application of axially directed traction and pushing forces by the spindle to the valving member 15; the part 20b on pivotal link 20a and the part 20c being pressure plates as, for example, a thrust bearing arrangement between the spindle inner end and link 20a, which latter may include a link shank through a hollow spindle to a similar thrust bearing between the shank and spindle top ends. This arrangement has the advantage that the link 20a may remain connected to the ears, and the spindle 20 itself may be replaced by the other valve actuating means, for example, a fluid piston and cylinder unit.

This spindle-to-valving member connection or linkage arrangement with the spindle 20 threadably engaged in bonnet 11 is preferred to the alternative, wherein the end of the spindle itself is non-rotatably and directly pivotally connected between the parallel ears 18–18a, and wherein the hand wheel 21 rotationally drives or is connected with, or the hub of the hand wheel itself constitutes, a spindle-engaging nut, rotatable but axially fixed relative to the bonnet upper wall.

The part 20c cooperates with a central flat bottom surface of bonnet 11 adjacent the spindle-receiving bore to provide a stop in valve opening operation; and a circumferential bottom recessing 11b about the spindle-receiving region is provided to accommodate the diaphragm formation 22 at open position.

DETAILS OF DIAPHRAGM AND OPERATOR STRUCTURE

The shape of the diaphragm member 13 and its integral valving member 15, incorporating the core 17, preferably is produced by molding of a flexible elastomeric material impervious to the fluids to be handled. As seen for the normal or "as-molded" state, in the top and bottom plan views of FIGS. 3 and 4 taken with the section of FIG. 6, the diaphragm member 13 including 15 and 17 constitutes a structure symmetrical about a bisecting plane centered parallel between ears 18, 18a, and perpendicular to pin 19 and to the clamped flat mounting rim 12 of the diaphragm, and thus also perpendicular to annular body rim flange 11a in the assembled valve. The above-defined axis of the seating bevel of valving member 15 thus lies in the plane of symmetry and intersects the center of pin 19 at its pivot axis designated by point 24 in FIG. 6.

For both of the extreme positions, the open and closed positions of FIGS. 1 and 2, in the region between the mounting rim 12 and the valving element 15 the diaphragm has a circumferentially continuous, inverted annular trough-like structure 22, concave as viewed from the valve seat 16 thus to arch up toward spindle 20, and here termed the "annular vault" 22, the radial sections of which each appears as an upward "loop" or arch. For the "as-molded" condition, thus the free normal shape, which corresponds to the shape assumed (FIG. 6) when the valve member 15 is midway between its extreme positions for the valve full open state and the valve closed state respectively, the general configuration of this formation 22 is annular, or roughly semi-toroidal, about the vertical axis of rim 12, here termed the axis of member 13, resulting in something of an inverted tulip-like shape for the diaphragm.

Though diaphragm 13 curves up from the mounting plane at 23 into the annular vault formation 22, the valving member 15 is supported in its dependent low position, from the inwardly downwardly curving internal periphery of the vault by integrally molded connecting structure resulting in a central recess as seen from the top.

The wall thickness in the vault portion is uniform from the thickened clamping rim 12 to the filleted regions of juncture with the material valving member portion 15. As seen in FIGS. 1 and 2, the outer slope or surface of the bead 10b, up to the region where it rounds over to the body opening, is complementary in shape to the adjacent part of the vault interior surface and to the region of its merging into the flat bottom of the rim 12.

In the discussions, particular consideration is given to the structure and behaviour of the diaphragm at the vault sections or "loops" 22L, 22R, diametrically opposed in the plane of symmetry, since during shift between open and closed positions certain extremes in behaviour or structural shape occur at those regions, with a uniform gradation or change from one radial section to another in the intervening circumferential regions.

Figure 6:
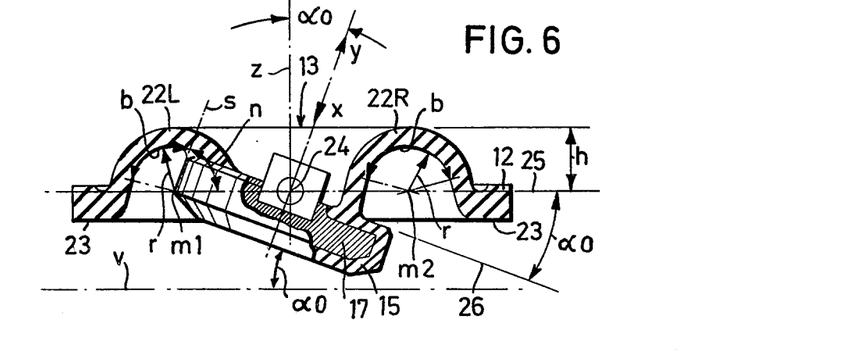

The enlarged sectional view of FIG. 6, corresponds in diaphragm shape and parts relations to the conditions prevailing when the valve is set midway between the full open and closed conditions of FIGS. 1 and 2 respectively, and by line 25 designates a plane, also called plane 25, parallel to the plane of the flat bottom surface 23 of the diaphragm rim flange 12, which latter plane in the assembled valve is also the plane of the annular mounting seat 10f. For this as-molded shape, the centers of curvatures m1 and m2 of the "loops" or sections 22L, 22R, (and correspondingly so also all of the centers of curvatures for other radial sections of the annular vault), and the pivot axis at point 24 for valving member tilting, relative to the spindle on the previously named pin 19, are all disposed in the common reference plane 25, which also passes through and is parallel to rim 12 and thus is parallel to body axis v. Point 24 is also the point of force application through the pivot pin 19 to the valve member by the spindle, of which the axis x-y is also the line of action; and for the mid-setting condition, hence for the as-molded shape, point 24 also is on the vertical axis of and hence central to member 13. Here and at all positions, the axis 24 for the pivot 19 is perpendicular to the symmetry plane, extending in a direction "transverse" to though above the flow passage and the body axis.

In other words, for the mid-setting positions, the points 24, m1 and m2 lie on the intersection line of the reference plane 25 with the valve symmetry plane, which line runs parallel to the body longitudinal axis "v" and hence substantially parallel to the axis of the flow path passage; and the plane of member 15 is perpendicular to the spindle axis x-y.

Figure 7:
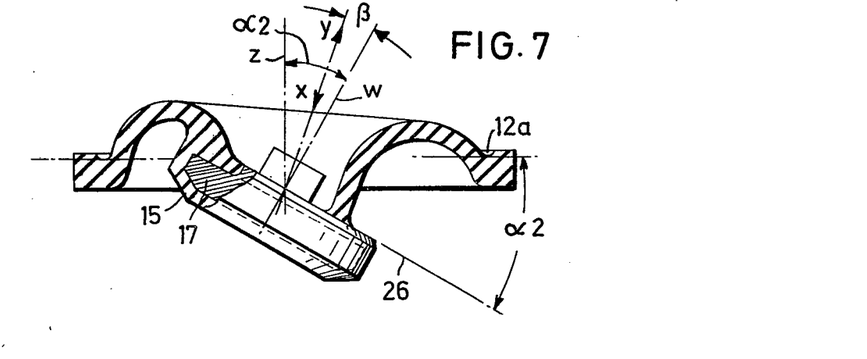

FIG. 6 shows further that, the left and right vault loops 22L, 22R have an equal height above the diaphragm flange 12; have equal radii of curvature "r"; and are symmetrically disposed relative to point 24; and taken with FIGS. 2 and 7 shows that the arcuate extent "b" in the loops, hence annular vault as a whole, affords the shiftable flexible support length necessary for seating actuation of the valving member 15. FIG. 6 also shows that for these "loops" the centers of curvature m1 and m2 lie in the plane 25, symmetrically, i.e., equiradially, spaced about the pivot or force application point 24, which is the case for the centers at all other radial sections in the as-molded state. Further the height "h" of vault 22 above plane 25, and the radius of curvature "r" at radial sections are respectively constant around the entire circumferential extent of the annular vault 22 for the as-molded form, and the vault 22 itself is symmetrical about the axis of member 13. These dimensions of course change as the valving member is shifted to either of the extreme positions of FIGS. 5 and 7, open and closed positions respectively, but in such shifting, and in the diaphragm shape at any position, there is a continuous change in such dimensions around the entire circumferential extent of vault 22.

Figure 5:
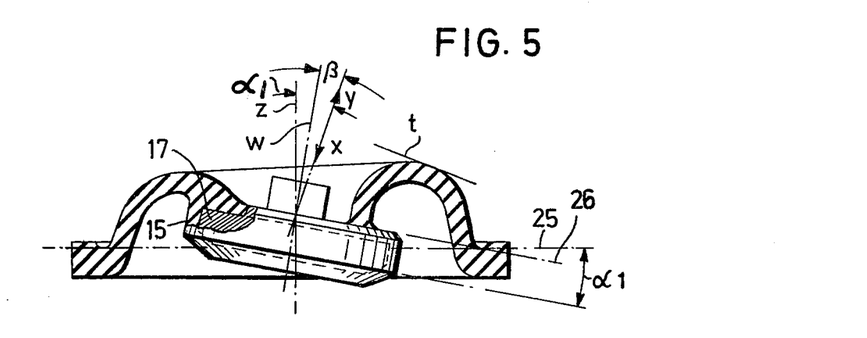

The valving member 15 for the FIG. 6 position, is tilted about the spindle attachment point 24 from horizontal by the angle "$\alpha_0$", the angle by which the axis x-y of spindle 20, hence also for FIG. 6, by which the axis "w" of valving member 15, are inclined away from the vertical "z" perpendicular to the plane 25 and passing through 24. In FIG. 6, that vertical is coincident with the axis of member 13. As the valving member position is changed, these angles of inclination change from $\alpha_0$, by an angular amount $\beta$; which then represents the divergence of the valving member axis "w" from the spindle axis x-y. In FIG. 5, $\beta$ is subtractive and the inclination of axis "w" and of member 15 are decreased to $\alpha_1$, but in FIG. 7 it is additive, with inclination increase to $\alpha_2$ which is, of course, the obliquity angle of seat 16 relative to axis "v". For the FIG. 6 condition of the preferred form, $\alpha_0$ is 20°; for the open position of FIG. 5, $\alpha_1$ is about 10°, and for the closed position $\alpha_2$ is about 30°. Thus the angle $\beta$ for the extreme positions amounts to 10° but in opposite senses.

At the mid position, the radii "r" of the section loops are the same over the entire circumferential extent of vault 22. At the vault semi-circumference below which the disk-like portion or member 15 extends obliquely beneath the rim or seat plane at 25, in progressing from loop 22R toward the left the arc lengths "b" above the plane 25 are found to be the same about up to the diameter of member 15 coincident with pivot point 24, where locally, in consequence of the higher region of attachment of member 15, the arc length "b" begins to decrease being gradually shortened in arcuate extent, ultimately at 22L by about the angular amount "n" measured from horizontal to the line "s", where the vault 22 meets the uppermost cylindrical part of the member 15, where "n" is an amount about complementary to the angle "$\alpha_0$". In actuation of the diaphragm to the open and closed positions, no compressions or stretchings are involved, and there is no change in the local lengths of the material providing the arcuate lengths "b".

In the specific embodiment shown in the drawings, the valve seat is inclined at about 30° to the axis "v", hence the axis of that seat is inclined from vertical, i.e., from the axis of the flat seat 10f, by the same angle.

The diaphragm presented in FIG. 6, as an example, for a diameter of 12 cm has a curvature radius of 1 cm for the local annular cross section of the annular vault, and the diameter of the valve member 15 then is typically 6 cm. The materials for such a diaphragm have been discussed above.

From FIG. 7, representing the open position, it is apparent that the radius "r" of the arch or loop 22R is greater than that at 22L, while in FIG. 5, for closed position the relation is reversed; but nevertheless at both left and right, and thus also for intermediate regions, the curvature remains directed upwardly for all settings.

However, during the opening movement, the loop 22R for example is uniformly narrowed and its curvature radius "r" becomes smaller; with the behaviour at loop 22L being the reverse as it widens and its curvature radius "r" increases. Hence for open positions, proceeding from right loop 22R toward the left, a circumferentially decreasing curvature is found with the greater radius of curvature at the loop 22L.

The change of the radius r in vault 22 and therefore the curvature or bending is quite small, since as represented in FIG. 6, tangents to the exterior of the vault as at "t", spaced at respectively equal arcuate distances from the rim 12, undergo an angular change of only about 5° for the shift from the mid-setting to either open or closed settings.

Upon the upward movement of the spindle 21 effected through the hand-wheel 21, in an unseating swinging motion indicated by the direction arrows 27-27a-27b in FIG. 1, the valving member 15 is lifted from the valve seat 16 to the fully open position. There the member 15 lies mainly above the plane of the diaphragm rim accepting seat 10f, having been brought up between the loops 22R and 22L to a location within the body opening above the flow passage, and with its bottom plane, at the line 26, almost parallel with the valve axis "v" as appears from the FIG. 1. Consequently for this unseating lifting, the shorter loop 22L requires a shorter path of travel than does the longer loop 22R.

The spindle 21, being pivotally connected to the valving member 15 by pin 11 at the action point 24, with the rectilinear motion on the axis x-y, so acts that the valving member can assume different settings and positions, since the maintained formation 22 is resiliently yieldable so that lateral displacement components are permitted.

FIGS. 1 and 2 show that the spindle connection and force application point 24 is centrally located on the valving member 15 and, moreover, throughout the extent of actuation is as well approximately centralized relative to the diaphragm 13; and that, through the tilting or canting motion of the valving member about the pivot axis 24 above and transverse to the flow path, no radial displacement of the spindle on or relative to the valving member occurs, so that there is a wear-free connection between the spindle and the valving body. However, for some applications of this general diaphragm organization in a housing, the connection point 24 may be located on member 15 somewhat off that central location, e.g., in the direction toward the flow passage.

The diaphragm membrane accordingly undergoes in effect a flap-like swinging movement as though about a swing axis transverse to and above the flow path and to the upstream side of the valve seat, and with no basic or fundamental shape change such as the change between convex and concave shape which occurs in many prior art diaphragms so that the diaphragm here basically maintains its as-fabricated form in its operative movements.

FIG. 1 also shows that, even in the region of the loop 22L, the gap at the seat, which arises by valve lifting, is favorably disposed to the flow to be flushed from below and thereby be kept constantly clean of contaminants, so that upon closure a more reliable and tighter seating and sealing results.

Figure 8:
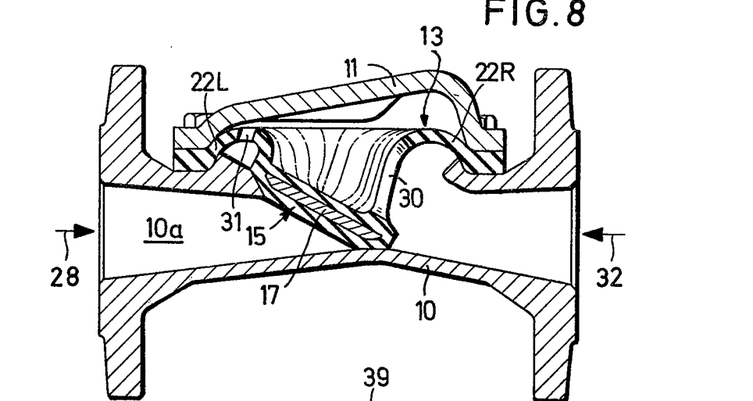
FIG. 8 shows, in longitudinal section, a check valve embodying the invention.

CHECK VALVE EMBODIMENT—FIG. 8

A check valve embodiment of the invention is represented in FIG. 8, for closed position, wherein parts or structural features corresponding or analogous to those of prior figures are designated by like or similar reference numerals. The valve body 10 is substantially identical to that of FIGS. 1 and 2; and to provide the check valve flap, the diaphragm structure 13 has the general form previously described, but with omission of the actuator connecting ears from, and use of, a lighter molded-in valving-member-reinforcing core plate 17, and certain other minor differences hereinafter noted. Of course, the cover or housing upper part 11 is simplified by omission of the apertured, threaded spindle-supporting boss of those prior figures. In FIG. 8, obviously the inlet is necessarily at the left end, with the normal unchecked flow being here from left to right. Otherwise the form of the parts, and the mode of clamping the diaphragm are essentially unchanged; though for most check valve applications it may be useful that the "as-molded" shape be close to that shown in FIG. 8, so that the valve member 15 is biased toward the closed position shown.

In the annular vault 22 at least one of the right and left diametric locations 22R–22L has a perforation or aperture, here both having the apertures 30, 31 respectively, in a preferred form, as practical since cover 11 has no openings inward of its rim where it is sealed to the body rim by the diaphragm rim clamped therebetween and, as in other embodiments, serving a gasket function. These apertures provide equalization of pressures on opposite sides of the diaphragm, i.e., in the superior space between diaphragm 13 and cover 11 and in the space therebeneath on the outlet or downstream side of the seat; the fluid simply moving in and out of the superior space as the valve opens and closes, and aiding flushing. Aperture 30, having a deep slot-like form reaching down the full depth of the central recess to the valve member portion 15, allows the diaphragm top recess to drain of liquid when the valve body itself becomes empty. Moreover, under pressure of reverse flow in direction 32, these apertures assist a quick transit of the valving member down to the seated position from an uppermost displaced position within the confines of the cover 11. A central stop formation for member 15 may be provided on the bottom of the cover.

The basic "as-fabricated" form of the diaphragm 13 is advantageously so chosen that the "as-molded" form corresponds to the shape in FIG. 8, which as in the shutoff valve of FIG. 6, where $a_2 = 30°$, provides a 30° inclination of the valving member 13, the same as the seat inclination angle relative to the body axis.

Figure 9:
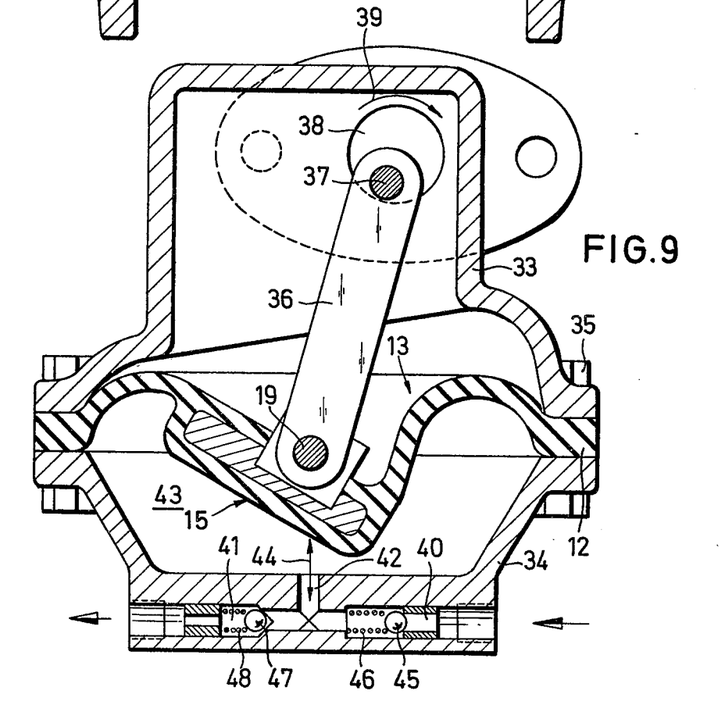
FIG. 9 is a longitudinal section of a diaphragm pump in accordance with the invention.

DIAPHRAGM PUMP EMBODIMENT—FIG. 9

In FIG. 9, a diaphragm structure in accordance with the invention is shown embodied in a diaphragm pump, comprised of hollow upper and lower housing members 33, 34 with opposed circular peripheral flanges secured by bolts 35 clamping the diaphragm flange 12 sandwiched therebetween as in previous figures.

The lower region of the upper member 33 is shaped somewhat similarly to cover 11 in FIGS. 1–2, but has a central upwardly extending crank case affording space accommodating a driving linkage comprising a connecting rod 36 with opposite ends pivotally connected to pivot pin 19 (at the diaphragm core plate ears) and to the crank pin 37 eccentrically carried by the crank or drive shaft 38 appropriately rotatably supported by bearing means in the crank case for rotation as indicated at 39, or in opposite sense, thereby continuously to lift and depress the diaphragm on intake and discharge strokes of the pump. The drive or crank shaft axis is offset from the axis of member 13 to the right i.e., to the side toward which member 15 slopes.

The lower housing member 34 has a basin-like form to define with diaphragm 13 a fluid working space 43 communicating through a vertical central bottom passage 42 with a horizontal bore running diametrically as a cross passage through the thick bottom wall. The right and left ends of the cross passage are counterbored for check valve chambers; and as pump intake and discharge points are threaded or otherwise appropriately furnished with piping connections.

On the inlet side, to prevent flow back out of the intake, an inlet ball check valve is provided by a retainer sleeve 40 forming a valve seat for ball 45 biased to closed position by helical spring 46; while at the other side, as a discharge side check valve preventing flow from the discharge point or line back into the pump, ball 47 is urged away from retainer sleeve 41 by helical spring 48 toward a conical counterbore bottom shoulder as a seat. Thus as indicated by arrow 44 at the central passage, in usual diaphragm pump type operation, the liquid or other fluid is alternatively drawn through the inlet valve into space 43 and expelled therefrom through the outlet valve.

Here the overall form of diaphragm 13 is generally similar to that of FIGS. 1–2; though the lugs or ears are offset to the right from center of the core plate, the center of member 15 is offset to the left of the axis of diaphragm 13, and the top of annular vault 22 is horizontal for the lowermost position as shown on the end of the discharge stroke. These changes and the offset of the crank shaft above noted, selected with respect to the crank pin throw, cooperate to provide a durable pump diaphragm arrangement.

However, the diaphragm in the pump advantageously may have an "as-molded" form as depicted in prior FIG. 6, that is, the shape which it is to assume at the operational position midway between its extreme positions with correlated changes in location of the other elements.

What is claimed is:

1. An apparatus comprising a first, lower, housing member having a circular top opening and an annular seat coaxial with the opening; a flexible diaphragm member spanning said opening and having an annular diaphragm rim lying in a plane and engaged with said seat over the entire circumference thereof, and a continuous inverted trough-like annular vault portion concentric with said rim to form an upwardly projecting concavity with arcuate radial sections; a second, upper housing member having an upwardly recessed bottom portion clamping the diaphragm rim on said seat; said diaphragm member in its central region including a disk-like portion obliquely disposed to and intersecting said plane of said rim and connected to said annular vault portion, said disk-like portion constituting an active member swingable about a swing axis in flap-like fashion between its upper and lower extreme positions, said upwardly projecting concavity being maintained at the extreme positions and all intermediate positions; said diaphragm member being substantially symmetrical with respect to a symmetry plane extending perpendicularly to and diametrically to said annular rim, with said swing axis perpendicular to the symmetry plane; and an actuating device having a longitudinal axis and being axially shiftable in said upper housing member, and being pivotably connected to said active member thereby providing, in the symmetry plane, an action point on the active member, said point being located approximately centrally of said active member; and wherein, for the as-fabricated shape of the diaphragm member, the centers of curvature of said arcuate radial sections of said annular vault at the symmetry plane, and said action point lie upon a line extending substantially parallel to and in the region of said rim.

2. Apparatus as described in claim 1, wherein the thickness of the diaphragm member rim is greater than the wall thickness of the annular vault portion.

3. Apparatus as described in claim 2, wherein the diaphragm member has a uniform wall thickness in the region of the annular vault portion and down to said active member.

4. Apparatus as described in claim 1, wherein the centers of curvatures of said arcuate sections of the annular vault portion have at least approximately equal radial spacings from the action point of the actuating device on the active member.

5. Apparatus as described in claim 4, wherein, the radii of curvatures of said radial sections of the annular vault portion are equal.

6. Apparatus as described in claim 5, wherein for a section at the symmetry plane of the diaphragm member when the active member is in the extreme upper position, said radial sections of the annular vault portion being remote from or proximate to said swing axis have respectively the smallest or the largest radius of curvature and in the regions therebetween the radius of curvature changes uniformly.

7. Apparatus as described in claim 6, wherein the shape of the diaphragm member when it is not loaded by operating pressure, corresponds to the shape it assumes with the active member at the mid-position between upper and lower extreme positions thereof.

8. Apparatus as described in claim 1, wherein said lower housing member forms a valve body having a substantially straight longitudinal flow passage therethrough and a valve seat disposed obliquely to the longitudinal axis of said flow passage and beneath said top opening, said active member has a seating portion occluding said valve seat as the movable active member is at its lowermost position.

9. Apparatus as described in claim 8, wherein said axis of the actuating device at its line of action on the active member, extends in a direction oblique to the axis of the flow passage.

10. Apparatus as described in claim 8, wherein the active member in its extreme upper position is substantially removed from the flow passage with its lower surface extending nearly parallel to the longitudinal axis of the flow passage.

11. Apparatus as described in claim 8, wherein said angle of the valve seat obliquity is about 30°, and the active member in its lowermost position is inclined to the flow passage axis at a like angle of about 30°.

12. Apparatus as described in claim 8, wherein upon retraction by the actuating device, from the lowermost position toward the uppermost position, the active member pivots about the connection thereof with said valve seat with an axis transverse to the axis of said flow passage.

13. Apparatus as described in claim 8, wherein a circumferentially running continuous relief groove approximating semi-circle in cross section is provided in the diaphragm member at the transition region between the upper surface of the diaphragm rim and said radial sections of the annular vault portion.

14. Apparatus as described in claim 8, wherein the actuating device is connected to the active member by a stationary pivot pin with the pin axis extending transversely to said axis of the flow passage.

15. Apparatus as described in claim 8, wherein said setting portion of the active member at its middle position is disposed perpendicularly to said longitudinal axis of the actuating device.

16. Apparatus as described in claim 15, wherein relative to the axis of said flow passage, the angle of the active member
at its open, uppermost position is about 10°; and
at its middle position is about 20°.

* * * * *